United States Patent Office

3,644,575
Patented Feb. 22, 1972

3,644,575
DYEABLE POLYPROPYLENE FIBERS HAVING IMPROVED PROPERTIES AND DYEING PROCESS FOR PRODUCING ARTICLES WHICH HAVE FASTNESSES
Kazuo Nakatsuka, Fumio Ide, and Kazuo Ito, Ohtakeshi, and Norimasa Yamamoto, Aichi-ken, Japan, assignors to Mitsubishi Rayon Co., Ltd., Tokyo, Japan
Filed Dec. 30, 1966, Ser. No. 606,090
Claims priority, application Japan, May 23, 1966,
41/32,868
Int. Cl. C08f *29/12;* D06p *3/00, 5/00*
U.S. Cl. 260—876 R  16 Claims

ABSTRACT OF THE DISCLOSURE

A polypropylene composition comprising polypropylene graft copolymerized with a vinylpyridine and an acrylate or methacrylate ester, the graft copolymer being prepared from a polypropylene which has been previously hydroperoxidized at temperatures of 70–130° C. The mixture is subjected to melt-spinning as such or after incorporation of a monomeric surface active agent and/or an organophosphorus compound to obtain fibers having excellent stability to heat, light and oxidation, dyeability and color fastness.

---

This invention relates to polypropylene fibers stable to light, heat and oxidation and excellent in dyeability and color fastness, particularly excellent in fastness to light, and to a dyeing process for producing articles which have fastnesses.

As is well known, crystalline polypropylene is excellent in physical and chemical properties and is useful as a material for preparing fibers and films. On the other hand, however, it suffers from such drawbacks that, due to its chemical characteristics, it is low in affinity for dyes and is difficultly dyeable, and that it is unstable to heat, light and oxidation and is quickly deteriorated in quality when exposed to high temperature in air.

In order to improve the above drawbacks, various methods have heretofore been proposed. For example, for the improvement in dyeability, there is a method in which polypropylene is mixed with a dyeable polymer such as, for instance, polyamide, polyester or vinylpyridine polymer. However, the obtained mixtures according to said method are inferior in compatibility of the mixed polymer with polypropylene and cause such troubles as thread-cutting and the like in spinning and drawing steps. Further, the resulting fiber is coarse and is rough to the touch and is difficultly dyed to deep color, and the mixed polymer oozes out during the dyeing and scouring steps with the result that no clearly dyed product can be obtained. Moreover, it is impossible to subject the dyed product to re-dyeing because the mixed polymer oozes out.

British Pat. No. 850,471 and U.S. Pat. No. 3,073,667 disclose processes in which, in order to improve the above drawbacks, vinylpyridines having affinity for dyes are grafted on the polypropylene, whereby dyeable fibers shaped polypropylene articles are obtained. The fibers obtained according to the above processes show considerably favorable dyeability, but still suffer from such drawbacks as shown below.

(1) The reaction for grafting vinylpyridine on polypropylene is difficultly controllable, and the resulting fiber is not uniform and undergoes uneven dyeing.

(2) In effecting the graft-polymerization, polypropylene is required to be activated, but the polypropylene itself is deteriorated during the activation process, and the resulting fiber is lowered in mechanical properties.

(3) Graft polypropylene, in which vinylpyridine has only been grafted, is poor in spinnability, and a dyed product of the resulting fiber is low in fastness to sunlight and is not desirable for practical use.

(4) In graft polypropylene, in which vinylpyridine has only been grafted, the branch polymer is high in second order transition point and has a rigid structure and, as seen from the results of measurements of dynamic viscoelasticity and stress relaxation spectra thereof, there has been formed a cross-linked structure between graft polymers, and therefore the melt viscosity of the graft polypropylene is higher than that of unmodified polypropylene. Thus, the graft polypropylene is low in compatibility with unmodified polypropylene, so that in preparing filaments from a mixture of graft polypropylene and unmodified polypropylene, there occur such troubles as thread-cutting and the like in spinning and drawing.

In order to overcome the above drawbacks, the present inventors examined processes in which, the monomer mixture of vinylpyridine with styrene, vinyl chloride, vinyl acetate, methacrylate, or acrylate was grafted on the polypropylene and then the resulting graft polypropylene was subjected to melt-spinning. As the result, said inventors found that polypropylene co-grafted with vinylpyridines and styrene also forms a cross-linked structure between polymers and hence is poor in melt-flowability, and polypropylene co-grafted with vinylpyridines and vinyl chloride or vinyl acetate is thermally decomposed at a spinning temperature to color and foam the polymer and hence is not spinnable, whereas polypropylene co-grafted with vinylpyridines and methacrylates or acrylates shows no such drawbacks as above. Subsequently, the inventors made more detailed examination to find that a fiber having excellent heat-resistance, oxidation stability, dyeability and color fastness can be obtained by specifying the composition and molecular weight of a branch polymer grafted on polypropylene; the molecular weight and amount of active groups of activated polypropylene to be used in grafting; and the content of branch polymer based on the total polypropylene composition. Based on the above finding, the inventors have accomplished the present invention.

The first object of the present invention is to obtain polypropylene fibers excellent in stability to heat, light and oxidation, dyeability and color fastness, particularly fastness to sunlight, by mixing a specific graft polypropylene having excellent melting characteristics with unmodified polypropylene and subjecting the mixture to melt spinning.

The second object is to further improve the polypropylene fibers in stability to heat, light and oxidation and in dyeing characteristics by further incorporating into the composition containing the specific graft polypropylene the following compound that is a specific surface active agent; a specific surface active agent and at least one of organo-phosphorus compounds.

The third object is to use graft polypropylene having a specific stable structure which can be obtained on a commercial scale and under safe, uniform and advantageous conditions.

The fourth object is to improve the operation efficiency and to facilitate the adjustment in content of dye-site.

The fifth object is to remarkably improve fastness to light of the fibers containing the above-mentioned specific graft polypropylene in dyeing the same with an ordinary dispersed dye or acid dye, by treating the same with a solution or emulsified dispersion solution containing a specific organo-phosphorus compound before or after or during the dyeing.

That is, the gist of the present invention resides in polypropylene fibers and dyeing process, characterized in which graft polypropylene obtained by co-grafting vinylpyridines and acrylates or methacrylates on polypropylene is mixed with unmodified polypropylene and the mixture is subjected to spinning either as such or after incorporation of a specific nonionic surface active agent and/or at least one member selected from the group consisting of organo-phosphorus compounds.

In practicing the present invention, various procedures may be adopted for co-grafting vinylpyridines and acrylates or methacrylates on polypropylene. For example, graft polypropylene can be obtained by activating polypropylene powder with oxygen, air or an ionizing radiation such as X-ray, β-ray or γ-ray and then contacting the activated polypropylene powder with vinypyridines and acrylates or methacrylates. A preferable graft-co-polymerization process is carried out by dispersing crystalline polypropylene powder in an aqueous emulsion containing a nonionic surface active agent, activating the polypropylene with an organic radical initiator and molecular oxygen and then contacting the same with vinylpyridines and acrylates or methacrylates.

Generally, in effecting graft-polymerization, polypropylene is required to be activated. However, in the activation of polypropylene, the scission of main chain is unavoidable, and in case the degree of scission of main chain is high, the resulting graft polypropylene is undesirably deteriorated in mechanical properties. Therefore, in order to avoid said deterioration the present inventors made studies on the above point to find that polypropylene is most preferably activated under the following conditions. That is, polypropylene is activated so that the intrinsic viscosity of the activated polypropylene $[\eta]_p$ and that of the polypropylene before activation, $[\eta]_0$ satisfy the relation $[\eta]_p/[\eta]_0 \geq 0.4$ (ratio of molecular weight retained in the activated polypropylene) and further the amount of active group, as a peroxide group, in the activated polypropylene is within the range of from 0.02 to 0.20 (wt.) percent, preferably from 0.04 to 0.08 (wt.) percent. Polypropylene so activated as to satisfy the above conditions can give graft polypropylene excellent in oxidation stability and weather resistance, without deteriorating mechanical properties, and further the graft-copolymerization thereof can be smoothly effected. The intrinsic viscosity of each of said polypropylenes was measured in tetraline solution at 135° C. (The same shall apply hereinafter). Such activated polypropylene may be prepared in such a manner that polypropylene having an intrinsic viscosity $[\eta]_0$ in the range of from 1.3 to 3.0 is treated in air at 80°–130° C. for 1–5 hours, and in case said polypropylene is in the form of an aqueous emulsion, it may be treated at 70°–120° C. for 2–10 hours in the presence of, as a catalyst, 0.1–1.0 (wt.) percent based on the polypropylene of an organic radical initiator such as benzoyl peroxide or azo-bis-isobutyronitrile.

Thus obtained activated polypropylene is contacted with vinylpyridines and acrylates or methacrylates and graft-polymerization is effected so that the branch polymer in the resulting graft polypropylene comprises 90–30 (wt.) percent of vinylpyridines and 10–70 (wt.) percent of acrylates or methacrylates and has an intrinsic viscosity $[\eta]$ in the range of from 0.2 to 2.0, preferably from 0.3 to 1.0.

For the above graft-polymerization, it is desirable to contact polypropylene peroxide with vinyl-pyridines and acrylates or methacrylates in the presence of, as a solvent, methanol or an aqueous metahanol solution or an aqueous solution of such organo-carboxylic acid as formic, acetic, propionic, butyric, isobutyric, lactic, glycolic, oxalic, malonic, succinic, maleic, tartaric, citric or benzoic acid, and as a reducing agent a compound such as ferrous sulfate, ferrous oxalate, ferrous acetate, ferrous ammonium sulfate, amines, sulfur compounds or 1-ascorbic acid.

Generally, in effecting graft-polymerization, the molecular weight of the branch polymer can be regarded as substantially equal to that of a non-grafted polymer by-produced in the graft-polymerization and hence can be presumed by measuring the intrinsic viscosity $[\eta]$ of the non-grafted polymer. In the present invention, therefore, the molecular weight of the branch polymer in the graft polypropylene has been regulated by the intrinsic viscosity $[\eta]$ measured in methanol solution at 25° C. of vinylpyridine-methacrylate or vinylpyridine-acrylate copolymer which is non-grafted polymer by-produced in the graft polymerization step. In the graft polypropylene thus obtained, the branch polymer has no rigid structure unlike in the case of a graft polypropylene in which vinylpyridine has only been grafted. Further, the result of measurement in dynamic viscoelasticity of the graft polypropylene shows no cross-linked structure. Therefore, the branch polymer has proper melt-viscosity and second order transition point, with the result that the melting behavior of the graft polypropylene has been greatly improved, and becomes quite similar to that of unmodified polypropylene. Thus, the graft polypropylene in accordance with the present invention suffers from no thermal decomposition even when subjected to melt-spinning step. Further, it has been improved in compatibility with unmodified polypropylene. In case the intrinsic viscosity $[\eta]$ of the branch polymer in the graft polypropylene is less than 0.2, which is out of the ranges specified in the present invention, the resulting fiber is poor in dyeability, while in case the intrinsic viscosity $[\eta]$ is more than 2.0, the dyestuff is left out from the dyed product in the soaping process, and so it is impossible to obtain a brilliant dyed product, and is undesirably lowered in oxidation stability and sunlight fastness.

The graft polypropylene in this invention thus obtained has been greatly improved in compatibility with unmodified polypropylene as compared with a graft polypropylene in which vinylpyridine has only been grafted, and does not at all suffer from such troubles as thermal decomposition and thread-cutting in spinning and drawing nor from cracking phenomenon in drawing. Further, the second order transition point of the branch polymer can be successfully lowered by limiting the composition and molecular weight of the branch polymer to the ranges specified in the present invention. Therefore, when the graft polypropylene of the present invention is mixed with unmodified polypropylene, the resulting fiber is markedly enhanced in mobility of the dye-sites and is greatly improved in dyeability, dyeing rate and brilliancy of dyed product, as compared with the case where graft polypropylene in which vinylpyridine has only been grafted.

When viewed from the aspect of stability, the graft polypropylene according to the present invention can give a fiber greatly improved in oxidation stability, light fastness and spontaneous oxidation resistance, as compared with the case of a graft polypropylene in which a vinylpyridine has only been grafted, because the graft polypropylene of the present invention has such a molecular structure that the vinylpyridine contained in the branch polymer is presented in an isolated state. The term "spontaneous oxidation" referred to herein indicates such a phenomenon that when exposed to a high temperature of more than 130° C., polypropylene fiber containing no stabilizer suffers, in general, from quick deterioration in polypropylene itself to show a temperature increase.

As detailed above, the graft polypropylene in this invention cannot be obtained unless there are strictly regulated such conditions as the amount of active group and molecular weight retention ratio of activated polypropylene, the composition and molecular weight of branch polymer in the graft polypropylene, graft-polymerization temperature and polymerization time, and the present invention is an entirely unique technique as compared with the conventional techniques.

In order to obtain the fibers of this invention with use of graft polypropylene having such characteristics as mentioned above, graft polypropylene containing 10–50 (wt.) percent of such branch polymer as specified hereinbefore is mixed with unmodified polypropylene so that the content of the branch polymer becomes 1–15 (wt.) percent based on the total polypropylene composition, and then the mixture is subjected to melt-spinning. In practicing the present invention, thus obtained graft polypropylene containing 10–50 (wt.) percent of branch polymer may be mixed, either alone or together with stabilizer if necessary, with unmodified polypropylene. The mixing procedure is not particularly regulated and may be effected according to either powder-mixing procedure or master batch procedure. The resulting composition may be subjected, either as such or after molding into the form of chips by means of an extrusion molding machine, to melt-spinning, whereby the desired fiber of this invention can be easily obtained. The reason in order to adjust the content of branch polymer by mixing the graft polypropylene having such a high grafting ratio with unmodified polypropylene is far easier than in the case where a graft polypropylene having branch polymer content of 1–15 (wt.) percent from the first. Further, the fiber obtained from the mixture of said graft polypropylene and unmodified polypropylene is not deteriorated in properties inherent to polypropylene but is excellent in dyeability and stability. Thus, the process of the present invention is markedly useful as a commercial production process.

The vinylpyridines employed in the present invention include 2-vinylpyridine, 3-vinylpyridine, 4-vinylpyridine, 2-methyl-5-vinylpyridine, 4 - methyl - 5 - vinylpyridine, 5-ethyl - 2 - vinylpyridine, 2-isopropenylpyridine, 3-isopropenylpyridine and 4-isopropenylpyridine.

Further, typical examples of acrylates and methacrylates to be co-grafted with the vinylpyridines are methyl acrylate, ethyl acrylate, propyl acrylate, butyl acrylate, 2-ethylhexyl acrylate, cyclohexyl acrylate, lauryl acrylate, stearyl acrylate, methyl methacrylate, ethyl methacrylate, propyl methacrylate, butyl methacrylate, cyclohexyl methacrylate, lauryl methacrylate and stearyl methacrylate.

On the other hand, in practicing the dyeing of improved dyeable polypropylene fibers of this invention, no specific limitations are required in scouring, dyeing and soaping steps. As the dyes used in the present invention, there may be employed acid dye, acid mordant dyes, metal complex dyes and disperse dyes, among which acid dyes, metal complex dyes and disperse dyes are preferably used. The improved polypropylene fibers of this invention are inherently excellent in color fastness. However, in order to further improve light fastness of pale colored article, the object can be accomplished in dyeing the same, by treating it with a solution or emulsified dispersed solution of such organo-phosphorus compounds as represented by the general Formulas I. II and III described hereinunder, before or after or during dyeing the same. These organo-phosphorus compounds may be used singly or in a mixture of two kinds thereof.

In general, fastness to sunlight of dyed article is dominated by a dye concentration applied to said dyed article. According to generally accepted technical concept, no problem may be encountered in the case of deeply colored article obtained in a dye bath, wherein a dye concentration is usually about 5% OWF, but it may be extremely difficult to hold sunlight fastness in the case of palely colored article obtained in a dye bath, wherein a dye concentration is about 0.5% OWF. According to the dyeing process of the present invention, however, such drawback can be improved easily and greatly in an industrial scale.

The process for treating the dyeable polypropylene fibers of this invention with the abovementioned organophosphorus compounds will concretely be illustrated hereinbelow. Before dyeing, the dyeable polypropylene fibers may be treated with these organophosphorus compounds present in a solution or emulsified dispersed solution, or may be treated simultaneously with dyeing of said fibers in a dye bath to which these organo-phosphorus compounds have been previously added. Or, these organophosphorus compounds may be added to an ordinary soaping bath employed subsequent to dyeing step, or the dyed fibers may be treated with a solution or emulsified dispersed solution containing these organophosphorus compounds. Usually, these organo-phosphorus compounds are applied to the fibers of this invention in a dye concentration within a range of from 0.05 to 50%, preferably from 0.5 to 30%. When a dye concentration is excessively low beyond the above-specified range, the object of the present invention may hardly be accomplished, and when it is excessively high, it is undesirable from the points of deteriorating the touch of the fibers obtained and of increasing the production cost.

Of the dyes preferably used in the present inveniton, typical dyes of respective types, for example, may be illustrated as follows :

Acid dyes

Suminol Milling Red (C.I. 23285)
Solor Scarlet R mfd. by Sumitomo Kagaku K.K.: C.I. Acid Red 77)
Fenazo Scarlet B (C.I. 26905)
Kayaku Acid Fast Yellow GG (C.I. 18965)
Xylene Light Yellow 2 GP (C.I. 18900)
Solway Blue BN-150 (C.I. 63010)
Xylene Fast Blue P (mfd. by Sandoz: C.I. Acid Blue 82)
Brillant Alizarine Milling Blue G (C.I. 61135)
Solway Green G 150 (C.I. 61570)

Acid mordant dyes

Eriochrome Flavine 3 R (mfd. by Geigy: C.I. Mordant Yellow 42)
Ericochrome Red 3 B (mfd. C.I. 58005)
Mitsui Alizarine Red S (C.I. 58005)
Solochromate Fast Blue B (C.I. 17940)
Solochromate Flavine G (C.I. 14130)

Metal complex dyes

Carbolam Yellow 4G-150 (mfd. by I.C.I.: C.I. Acid Yellow 70)
Chibalan:
    Yellow GRL (mfd. by Ciba: C.I. Acid Yellow 116)
    Blue BRL (mfd. by Ciba: C.I. Acid Blue 170)
    Scarlet GL (mfd. by Ciba: C.I. Acid Red 209)
Lanasyn:
    Yellow 3GL (mfd. by Sandoz: C.I. Acid Yellow 111)
    Red BL (mfd. by Sandoz: C.I. Acid Red 215)
Brillant Blue GL (C.I. 61135)
Neolan:
    Yellow GR (C.I. 13900)
    Red GRE (C.I. 18800)
    Blue 2G (C.I. 22250)

DISPERSE DYES

Dia Celliton:
    Fast Yellow GF (C.I. 11855)
    Fast Red RF (C.I. 50305)
    Fast Blue BF (C.I. Blue 14)
Kayalon:
    Fast Orange GR (C.I. 11005)
    Fast Scarlet B (C.I. 11110)
    Fast Blue FG (C.I. 62050)
Celliton:
    Fast Blue Extra (C.I. 64500)
    Fast Yellow RR (C.I. 22250)
    Fast Scarlet R (C.I. 11150)

Further, when the mixing of the graft polypropylene of the present invention with unmodified polypropylene is effected in the presence of nonionic surface active agent specified in the present invention and/or at least one member selected from the group consisting of an organo-phosphorus compound, the effects of the present invention can be further enhanced.

That is, when the graft polypropylene of the present invention and at least one of the nonionic surface active agents specified are mixed with unmodified polypropylene, the resulting fiber is improved in dispersibility of dyesites, even when the content of vinyl pyridine in the composition is low. Accordingly, the fiber can be dyed to deep and brilliant color according to an ordinary dyeing method using an ordinary dye, and a dyed product substantially free from uneven dyeing can be obtained.

The above effects are considered ascribable to the fact that among the surface active agents, nonionic surface active agents are particularly suitable for dispersing the present graft polypropylene in unmodified polypropylene.

Another procedure for using the nonionic surface active agent specified in the present invention in combination with the present graft polypropylene is such that the nonionic surface active agent is employed as an emulsifier in the preparation of the present graft polypropylene.

The above-mentioned specified nonionic surface active agents include polyoxyethylene alkyl amines, polyoxyethylene alkyl ethers, polyoxyethylene alkylphenol ethers, polyoxyethylene alkyl esters, sorbitan alkyl esters, polyoxyethylene sorbitan alkyl esters, polyoxyethylene, polyoxypropylene, polyoxyisobutylene, copolymer of ethylene oxide and propylene oxide.

Of the above surface active agents, particularly preferable are polyethylene glycol, polypropylene glycol and copolymer of ethylene oxide and propylene oxide.

When the mixing of the present graft polypropylene with the nonionic surface active agent is effected in the presence of at least one of organophosphorus compounds specified in the present invention, there occurs a synergistic action between the present graft polypropylene and the mixed compounds, whereby the resulting fiber, when dyed, gives a dyed fiber greatly improved in sunlight fastness, and brilliancy. Thus, the above compounds are useful for enhancing the effects of the present invention.

In the above case, even when the nonionic surface active agents and organo-phosphorus compounds are mixed independently or in admixture of one or more, the effects of the invention can be enhanced as compared with the case where the present graft polypropylene is used singly.

Preferable modes of mixing in accordance with the present invention are as follows:

(1) The present graft polypropylene is mixed with unmodified polypropylene.

(2) The present graft polypropylene and the nonionic surface active agents are mixed with unmodified polypropylene.

(3) The present graft polypropylene, the nonionic surface active agents and organo-phosphorus compounds are mixed therewith.

Organo-phosphorus compounds specified in the present invention are shown below, for example.

The organo-phosphorus compounds to be used are those represented by the general formula wherein $R_1$, $R_2$ and $R_3$ are, respectively, hydrogen atom or alkyl, aryl or aralkyl radical; and X is oxygen or sulfur atom; the general formula wherein $R_4$ and $R_5$ are, respectively, an alkyl, aryl or aralkyl radical; and the general formula wherein $R_6$, $R_7$, $R_8$ and $R_9$ are, respectively, alkyl, aryl or aralkyl radical; and $R_{10}$ and $R_{11}$ are, respectively, hydrogen atom or alkyl radical.

Concrete examples of such compounds are as follows:

$(C_4H_9O)_2POH$ (corresponding to DBHP)
$(C_{12}H_{25}O)_3P$ (corresponding to Trilauryl Phosphite)
$(C_{18}H_{37}O)_3P$ (corresponding to T.O.P.)
$(C_4H_9-CH-CH_2O)_3P$ corresponding to TEHP)
       |
       $C_2H_5$

(corresponding to tri-nonylphenyl phosphite)

(corresponding to EHPP)

$(C_{12}H_{25}S)_3P$ (corresponding to TLTTP)

(corresponding to p,p' - methylenebis [bis(p - nonylphenyl)-phenyl(phosphite)].

(corresponding to p,p' - butylenebis [bis(p - nonylphenyl)-phenyl phosphite)].

Of these, preferable organo-phosphorous compounds to be used in the present invention are trioctadecyl phosphite, p-nonylphenyl phosphite and trilauryl trithio phosphite. These may be used alone or in admixture of 2 or more.

If necessary, it is also possible to add, in addition to the above-mentioned additives, an oxidation stabilizer such as tetrakis [3-(4-hydroxy-3,5-ditert.-butyl phenyl) propionyl oxymethyl]-methane (corresponding to RA–1010), 1,3,5-tris (4-hydroxy-3,5-ditert.-butyl benzyl)-2,4,6-trimethyl benzene (corresponding to Ionox 330), and 4,4'-thiobis (5-methyl-2-tert.-butyl phenol) corresponding to Santonox), a peroxide decomposing agent such as dilauryl thiodipropionate (corresponding to DLTDP), a ultraviolet absorber such as 2-hydroxy-4-octyloxybenzophenone (corresponding to UV–531), 4-dodecyloxy - 2 - hydoxybenzophenone (corresponding to DOBP), 2-hydroxy-4-octadecyloxy benzophenone, or 2-[2 - hydroxy - 5 - (1,1,3,3 - tetramethylbutyl) phenyl]-5-chlorobenzotriazole (corresponding to He–327), metal salt of higher fatty acid such as calcium stearate or zinc stearate, organotin compounds, titanium dioxide, fluorescent brightening agent, antistatic agent and low molecular weight polyethylene.

The following examples illustrate the present invention further in detail.

EXAMPLE 1

Polypropylene powder having an intrinsic viscosity of 2.0 was heated in air at 110° C. for 2 hours to prepare a peroxidised polypropylene having hydroperoxide content of 0.05 (wt.) percent and an intrinsic viscosity of 1.5. This peroxidised polypropylene was contacted in methanol with 2-methyl-5-vinylpridine and methyl acrylate to obtain various graft polypropylene having such compositions of branch polymers as shown in Table 1. These graft polypropylene were added to unmodified polypropylene so that the branch polymer contents became the proportions as shown in Table 1 and the mixtures were subjected to melt-spinning at 250° C. and were drawn to MDR (maximum drawing ratio; the same shall apply hereinafter) × 0.8. The resulting fibers were examined in oxidation stability and dyeability under the conditions as shown below to obtain the results set out in Table 1.

Oxidation stability test

Figure 1:
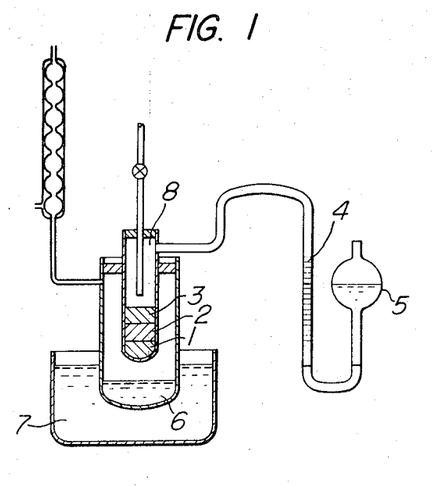
Figure 2:
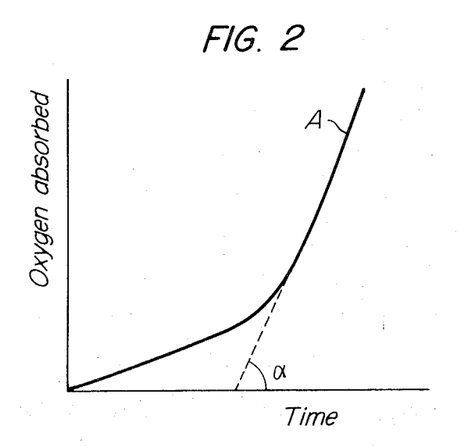

As shown in FIG. 1, a bottom portion 1 of a reaction tube having a capacity of 190 cc. is packed with calcium oxide, a sample 3 is filled therein over glass wools 2 interposed between 1 and 3. Amount of oxygen absorbed at a fixed temperature is traced by a manometer 4 with the lapse of time. Numbers 5, 6, 7 and 8 show a mercury reservoir, hot medium, oil bath and oxygen atmosphere respectively. Generally, a sample containing no stabilizer absorbs oxygen at a high temperature. In this case, the stability thereof may be determined by seeking a value of tan α of an angle α obtained by extrapolating a portion (A) of adsorption curve as roughly illustrated in FIG. 2 with a time axis. In general, oxidation stability is favorably found when a sample has relatively lower value of tan α.

Dyeing test

A sample was dyed under the conditions shown below and the dyed sample was measured in degree of dye exhaustion and sunlight fastness.

Dyeing conditions:
  Dye concentration—
    5% OWF, acid dye
    Solway Blue BN–150 (C.I. 63010)
  Bath ratio—1:50
  Dyeing temperature and time—98° C.×90 min.
Degree of dye exhaustion:
  Colorimetrically measured on residual solution 50% aqueous pyridine solution as solvent (means used: Shimazu's diffraction grating type Spectronic 20).
Fastness to light:
  By fade meter method according to JIS–L–1044 (1959).

TABLE 1

| Experiment No. | Composition of branch polymer | Percent | Intrinsic viscosity of branch polymer η | Content of branch polymer in graft polypropylene (percent) | Content of branch polymer based on total polypropylene (percent) | Oxidation stability at (189° C.) tan α (cc./min./g.) | Degree of dye exhaustion (percent) | Fastness to light (grade) |
|---|---|---|---|---|---|---|---|---|
| 1 | 2-methyl-5-vinylpyridine / Methyl acrylate | 55 / 45 | 0.63 | 24 | 5.5 | 1.60 | 91 | 5 |
| 2 | 2-methyl-5-vinylpyridine / Methyl acrylate | 46 / 54 | 0.71 | 35 | 6.5 | 1.54 | 99 | 5–6 |
| 3 | 2-methyl-5-vinylpyridine / Methyl acrylate | 35 / 65 | 0.95 | 39 | 8.6 | 1.62 | 88 | 5–6 |
| 4 | 2-methyl-5-vinylpyridine / Methyl acrylate | 26 / 74 | 0.95 | 35 | 11.5 | 2.00 | 73 | 4 |
| 5 | 2-methyl-5-vinylpyridine / Methyl acrylate | 51 / 49 | 2.10 | 55 | 6.0 | 2.05 | 98 | 3 |
| 6 | 2-methyl-5-vinylpyridine / Methyl acrylate | 51 / 49 | 0.45 | 6.0 | 6.0 | 1.63 | 68 | 3 |
| 7 | 2-methyl-5-vinylpyridine / Methyl acrylate | 55 / 45 | 0.63 | 24 | 0.5 | 2.18 | 32 | 2 |

From the results of Table 1, it is recognized that all the samples obtained according to the present invention (Experiment Nos. 1, 2 and 3) have excellent oxidation stability and dyeability, whereas the controls (Experiment Nos. 4, 5 and 7) are low in oxidation stability and in fastness to light of the dyed products, and the sample of Experiment No. 6 is low in dyeability and in fastness to light of the dyed product, though it is favorable in oxidation stability.

EXAMPLE 2

Peroxidised polypropylene obtained in the same manner as in Example 1 was reacted with the vinyl pyridines and acrylates or methacrylates shown in Table 2 to obtain various graft polypropylenes as indicated in Table 2. Thereafter, the graft polypropylenes were formed into fibers and were subjected to dyeing test and oxidation stability test under the same conditions as in Example 1, using as acid dye Fenazo Scarlet B (C.I. 26905). The results of tests are shown in Table 2.

TABLE 2

| Experiment No. | Composition of branch polymer | Percent | Intrinsic viscosity of branch polymer [η] | Content of branch polymer in graft polypropylene (percent) | Content of branch polymer based on total polypropylene composition (percent) | Oxidation stability at (189° C.) tan α(cc./min./g.) | Results of dyeing test | |
|---|---|---|---|---|---|---|---|---|
| | | | | | | | Degree of dye exhaustion (percent) | Fastness to light (grade) |
| 1 | {2-methyl-5-vinylpyridine / Methyl acrylate} | 55 / 45 | 0.59 | 19 | 5.5 | 1.52 | 92 | 5-6 |
| 2 | {2-vinylpyridine / Butyl acrylate} | 40 / 60 | 0.85 | 23 | 7.5 | 1.62 | 91 | 5 |
| 3 | {5-ethyl-2-vinylpyridine / Lauryl methacrylate} | 38 / 62 | 0.60 | 20 | 7.9 | 1.58 | 88 | 5 |
| 4 | {4-vinylpyridine / Methyl acrylate} | 48 / 52 | 0.91 | 35 | 6.3 | 1.68 | 90 | 5-6 |
| 5 | {2-methyl-5-vinylpyridine / Lauryl methacrylate} | 95 / 5 | 0.72 | 25 | 3.3 | 2.05 | 95 | 4 |
| 6 | {4-vinylpyridine / Ethyl acrylate} | 25 / 75 | 1.05 | 38 | 12.0 | 2.10 | 87 | 3 |
| 7 | {4-vinylpyridine / Methyl acrylate} | 45 / 55 | 2.30 | 45 | 6.6 | 2.08 | 91 | 3 |

From the results of Table 2, it is recognized that the fibers obtained in accordance with the present invention (Experiment Nos. 1, 2, 3 and 4) are excellent in oxidation stability and color fastness as compared with the controls (Experiment Nos. 5, 6 and 7).

EXAMPLE 3

Various graft polypropylene as shown in Table 3 were obtained in the same manner as in Example 1. These graft polypropylenes and nonionic surface active agent and, if necessary, stabilizer were added to unmodified polypropylene, and the mixtures were subjected to melt-spinning and were drawn to MDR×0.9. The resulting fibers were subjected to the same dyeing test as in Example 1, except that the dye concentration employed was 2% OWF, to obtain the results as shown in Table 3.

TABLE 3

| Experiment No. | Composition of branch polymer | Percent | Intrinsic viscosity of branch polymer [η] | Content of branch polymer in graft polypropylene (percent) | Content of branch polymer based on total polypropylene composition (percent) | Nonionic surface active agent and added amount (percent) | Results of dyeing test | | |
|---|---|---|---|---|---|---|---|---|---|
| | | | | | | | Degree of dye exhaustion (percent) | Fastness to light (grade) | Fastness to washing (grade) |
| 1 | {2-vinylpyridine / Methyl acrylate} | 80 / 20 | 0.65 | 28 | 4.0 | Polyethylene glycol, 0.5. | 98 | 5 | 5 |
| 2 | {2-methyl-5-vinlpyridine / Lauryl methacrylate} | 75 / 25 | 0.55 | 18 | 4.0 | do | 96 | 5 | 5 |
| 3 | {2-methyl-5-vinylpyridine / Ethyl acrylate} | 80 / 20 | 0.61 | 31 | 4.0 | do | 100 | 5 | 5 |
| 4 | {2-methyl-5-vinylpyridine / Ethyl acrylate} | 80 / 20 | 0.61 | 31 | 4.0 | None | 81 | 3 | 4 |
| 5 | {2-methyl-5-vinylpyridine / Ethyl acrylate} | 80 / 20 | 2.30 | 48 | 4.0 | Polyethylene glycol, 0.5. | 100 | 4 | 2 |
| 6 | 2-methyl-5-vinylpyridine | 100 | 0.57 | 20 | 4.0 | do | 100 | 2 | 3 |

In Table 3, fastness to washing of dyed product was measured according to JIS–1045 BC–2 (1959).

From the results of Table 3, it is understood that the samples obtained in accordance with the present invention (Experiment Nos. 1, 2, 3 and 4) are collectively excellent as compared with the controls (Experiment Nos. 5 and 6), and that the use of nonionic surface active agent is effective in the present invention.

EXAMPLE 4

Various graft polypropylene as shown in Table 4 were obtained in the same manner as in Example 1. These graft polypropylenes were made into fibers and were then subjected to the same dyeing test as in Example 1, except that the dye concentration was 2% OWF, to obtain the results as set out in Table 4.

TABLE 4

| Experiment No. | Composition of branch polymer | Percent | Intrinsic viscosity of branch polymer [η] | Content of branch polymer in graft polypropylene (percent) | Content of branch polymer based on total polypropylene composition (percent) | Nonionic surface active agent | Results of dyeing test | | |
|---|---|---|---|---|---|---|---|---|---|
| | | | | | | | Degree of dye exhaustion (percent) | Fastness to light (grade) | Fastness to washing (grade) |
| 1 | {2-methyl-5-vinlpyridine / Butyl acrylate} | 80 / 20 | 0.92 | 32 | 3.0 | Polyethylene lauryl ether. | 98 | 5 | 5 |
| 2 | {2-vinylpyridine / Ethyl acrylate} | 70 / 30 | 0.80 | 26 | 3.0 | do | 96 | 5 | 5 |
| 3 | {2-methyl-5-vinylpyridine / Lauryl methacrylate} | 85 / 15 | 0.68 | 16 | 3.0 | do | 100 | 5 | 5 |
| 4 | {2-methyl-5-vinylpyridine / Lauryl methacrylate} | 85 / 15 | 2.58 | 45 | 3.0 | do | 100 | 4 | 2 |
| 5 | 4-vinylpyridine | 100 | 0.61 | 19 | 3.0 | do | 100 | 3 | 3 |

From the results of Table 4, it is understood that the fibers obtained in accordance with the present invention (Experiment Nos. 1, 2 and 3) are collectively excellent as compared with the controls (Experiment Nos. 4 and 5).

EXAMPLE 5

(A) One hundred parts of polypropylene powder having an intrinsic viscosity of 2.0 was dispersed in 400 parts of 1% aqueous solution of polyethylene glycol having a molecular weight of about 3000. The dispersion was incorporated with 0.2 part of benzoyl peroxide and was stirred in air at 90° C. for 4 hours to obtain a polypropylene peroxide having a hydro-peroxide content of 0.05% and an intrinsic viscosity of 1.4. One hundred parts of this peroxidised polypropylene was dispersed in 200 parts of an aqueous emulsion containing 5 parts of polyethylene glycol. To the dispersion, 10 parts of acetic acid was further added in order to form slurry. To the slurry were added 40 parts of 2-vinylpyridine, 10 parts of lauryl methacrylate and 0.5 part of ferrous sulfate, and reaction was effected at 70° C. for 5 hours while introducing a nitrogen gas. The resulting polymer was recovered by filtration, was washed with 5% aqueous oxalic acid solution, was further washed twice with water and was then dried to obtain 141 parts of a graft polypropylene. According to nitrogen analysis, thus obtained polymer had 2- vinylpyridine content of 23.4% and lauryl methacrylate content of 5.8%. Further, the amount of polyethylene glycol occluded in the polymer was 2.1%.

This graft polypropylene was added to unmodified polypropylene having an intrinsic viscosity of 1.5, so that the content of 2-vinylpyridine became 3.5% based on the total polypropylene composition. The polypropylene composition was incorporated, if necessary, with stabilizer, and was shaped into pellets at 220° C. The pellets were subjected to melt-spinning at 280° C. and were then drawn under the conditions shown in Table 5, and the resulting fiber was knitted. The cloth was dyed with the acid dye Fenazo Scarlet B (C.I. 26905) under the conditions of dye concentration of 2% OWF, sulfuric acid concentration of 0.5 g./l., a bath ratio of 1:50 and dyeing temperature and time of 98° C.×90 minutes. After soaping according to the ordinary procedure, the cloth was examined in dyeability to obtain the results as shown in Table 5A.

TABLE 5A

| Experiment No. | Drawing condition (130° C.) | Degree of of dye exhaustion (percent) | Uneven dyeing |
|---|---|---|---|
| 1 | MDR×0.4 | 98 | None. |
| 2 | MDR×0.6 | 100 | Do. |
| 3 | MDR×0.7 | 100 | Do. |
| 4 | MDR×0.8 | 100 | Do. |
| 5 | MDR×0.9 | 100 | Do. |

(B) For comparison, 2-vinylpyridine was only grafted on polypropylene in the same manner as in Example 1, to obtain a graft polypropylene containing 2.0% of polyethylene glycol and 24.3% of 2-vinylpyridine. This graft polypropylene was added to unmodified polypropylene so that the content of 2-vinylpyridine became 3.5%, and the mixture was formed into a fiber. The fiber was subjected to dyeing test under the same conditions as in the case of (A) to obtain the results as shown in Table 5B.

TABLE 5B

| Experiment No. | Drawing condition (130° C.) | Degree of dye exhaustion (percent) | Uneven dyeing |
|---|---|---|---|
| 1 | MDR×0.4 | 60 | Observed. |
| 2 | MDR×0.6 | 70 | Do. |
| 3 | MDR×0.7 | 80 | Do. |
| 4 | MDR×0.8 | 85 | None. |
| 5 | MDR×0.9 | 84 | Somewhat observed. |

From the results of Tables 5A and B, it is understood that the fiber obtained according to the present invention [Table 5A] is excellent as compared with the control [Table 5B], since the former suffers from neither uneven dye exhaustion nor uneven dyeing due to the difference of drawing condition.

EXAMPLE 6

Various graft polypropylenes as shown in Table 6 were obtained in the same manner as in Example 1. These graft polypropylenes and various additives as set out in Table 6 were added to unmodified polypropylene, and the mixtures were formed into fibers. The fibers were examined in dyeability and fastness to light according to Examples 1 and 5 to obtain the results as indicated in Table 7.

TABLE 6

| Experiment No. | Composition of branch polymer | Percent | Intrinsic viscosity of branch polymer ($\eta$) | Content of branch polymer in graft polypropylene (percent) | Content of branch polymer based on total polypropylene composition (percent) | Antioxidant 0.2 (wt.) percent | Organo-phosphorus compound 0.4 (wt.) percent | Nonionic surface active agent 0.5 (wt.) percent |
|---|---|---|---|---|---|---|---|---|
| 1 | 2-vinylpyridine / Ethyl hexyl acrylate | 48 / 52 | 0.71 | 23 | 7.0 | RA-1010 | TLTTP | |
| 2 | 2-vinylpyridine / Ethyl hexyl acrylate | 48 / 52 | 0.71 | 23 | 7.0 | RA-1010 | DPPD | |
| 3 | 2-vinylpyridine / Ethyl hexyl acrylate | 48 / 52 | 0.71 | 23 | 7.0 | RA-1010 | TOP | |
| 4 | 2-vinylpyridine / Ethyl hexyl acrylate | 48 / 52 | 0.71 | 23 | 7.0 | RA-1010 | TOP | Polyethylene glycol. |
| 5 | 2-vinylpyridine / Ethyl hexyl acrylate | 48 / 52 | 0.71 | 23 | 7.0 | RA-1010 | TOP | Polypropylene glycol. |
| 6 | 2-vinylpyridine / Ethyl hexyl acrylate | 48 / 52 | 0.71 | 23 | 7.0 | RA-1010 | | |

In the marks used in Table 6, TLTTP is trilauryl trithiophosphite, DPPD is diphenyl pentaerythritol diphosphite, and TOP is trioctadecyl phosphite.

TABLE 7

| | Results of dyeing test | |
|---|---|---|
| Experiment No. | Degree of dye exhaustion (percent) | Fastness to light (grade) |
| 1 | 95 | 4 |
| 2 | 94 | 4 |
| 3 | 97 | 4 |
| 4 | 100 | 5 |
| 5 | 100 | 5 |
| 6 | 84 | 3 |

From the results of Table 7, it is understood that the fibers obtained according to the present invention (Experiments Nos. 1–51) are excellent both in dyeability and in fastness to light.

EXAMPLE 7

Graft polypropylene containing 16 (wt.) percent of branch polymer comprising 4-vinylpyridine and ethyl acrylate in a weight ratio of 75 to 25 and having an intrinsic viscosity [$\eta$] of 0.62 was prepared in the same manner as in Example 1. One hundred parts of this graft polypropylene was mixed with 200 parts of unmodified polypropylene, 0.5 part of p-nonylphenyl phosphite and a stabilizer, and the mixture was shaped into pellets at 220° C. The pellets were subjected to melt-spinning at 250° C. and were drawn at 130° C. to MDR×0.8. The obtained fiber having dry strength of 5.2 g./d. and dry elongation of 24%.

Thus obtained fiber was dyed with the acid dyes shown in Table 8 to obtain the results as shown in Table 8. The dyeing was effected under the conditions of dye concentration of 1% OWF, a sulfuric acid concentration of 0.5 g./l., and a bath ratio of 1:50.

TABLE 8

| Dye | Phosphorus compound-added graft polypropylene-containing fiber | | | Phosphorus compound-free graft polypropylene-containing fiber | | |
|---|---|---|---|---|---|---|
| | Degree of dye exhaustion (percent) | Fastness to light (grade) | Brilliancy (percent) | Degree of dye exhaustion (percent) | Fastness to light (grade) | Brilliancy (percent) |
| Fenazo Scarlet-B | 98 | 4-5 | 77.9 | 97 | 3 | 74.6 |
| Sminol Red-RS (C.I. 23285) | 93 | 4 | 79.8 | 95 | 2-3 | 76.9 |
| Solway Blue (BN-150) | 97 | 4-5 | 67.3 | 98 | 4 | 63.8 |
| Xylene Fast Blue-PR (C.I. Acid Blue 129) | 95 | 5 | 72.3 | 96 | 4 | 69.4 |

In Table 8, the brilliance is represented, in the case of Fenazo Scarlet-B and Sminol Red-RS, by Pe value when Y value was 10%, and in the case of Solway Blue BN-150 and Xylene Fast Blue-PR, by Pe value when Y value was 5%.

From the results of Table 8, it is understood that when phosphorus compound is added, the fiber of the present invention is further enhanced in fastness of color and brilliancy.

EXAMPLE 8

Crystalline polypropylene powder having an intrinsic viscosity of 2.0 was irradiated with γ-ray of 1.0 Mrad to obtain peroxidised polypropylene peroxide having a hydroperoxide content of 0.05 (wt.) percent and an intrinsic viscosity of 1.3. One hundred parts of this peroxidised polypropylene, 60 parts of 2-methyl-5-vinylpyridine and 6.0 parts of methyl acrylate were charged together with 150 parts of benzene into a reactor provided with a stirrer and were polymerized at 80° C. for 6 hours in a nitrogen atmosphere. The reaction product obtained was charged in a large amount of methanol, was recovered by filtration, was washed with methanol and was then dried to obtain 128 parts of a graft polymer. As the result of analysis, it was found that the graft polymer had a 2-methyl-5-vinylpyridine of 11 (wt.) percent and methyl acrylate content of 10 (wt.) percent.

This graft polypropylene and phosphorus compounds shown in Table 9 were added to unmodified polypropylene, and the mixtures were made into fibers in the same manner as in Example 7. These fibers were dyed with the acid dye Solway Blue BN-150 (C.I. Acid Blue 45) under the conditions of dye concentration of 1% OWF, sulfuric acid concentration of 0.5 g./l., a bath ratio of 1:50 and dyeing temperature and time of 98° C.×90 minutes, and were scoured in a bath containing 0.5 g./l. of Scourol No. 400 and 0.5 g./l. of sodium carbonate under the conditions of bath ratio of 1:50 and scouring temperature and time of 70° C.×20 minutes. The fibers were then subjected to dyeability test to obtain the results set out in Table 9, in which the brilliancy is represented by the value when Y value was 10%.

From the results of Table 9, it is understood that the fibers obtained according to the present invention (Experiments Nos. 2-7) are excellent in dyeability and brilliancy.

EXAMPLE 9

Crystalline polypropylene having an intrinsic viscosity of 2.0 was irradiated with γ-ray of 0.1, 1.0 and 3.0 Mrad, respectively, in air at room temperature, and was then contacted in methanol with a mixture of 2-methyl-5-vinylpyridine and butyl acrylate to obtain 3 graft polypropylenes having the compositions as shown in Table 10.

TABLE 10

| Sample No. | Irradiated dose (Mrad) | Properties of trunk polypropylene | | | Properties of graft polypropylene | | |
|---|---|---|---|---|---|---|---|
| | | Hydroperoxide content (percent) | $[\eta]_p$ | $[\eta]_p/[\eta]_o$ | 2-methyl-5-vinylpyridine/butyl acrylate (weight ratio) | Content of branch polymer (percent) | $[\eta]$ of branch polymer |
| A | 0.1 | 0.03 | 1.6 | 0.80 | 65/35 | 18 | 0.8 |
| B | 1.0 | 0.06 | 1.2 | 0.60 | 65/35 | 21 | 0.6 |
| C | 3.0 | 0.12 | 0.75 | 0.38 | 65/35 | 26 | 0.45 |

Thus obtained 3 graft polypropylenes were mixed with unmodified polypropylene having an intrinsic viscosity of 1.5, so that the content of 2-methyl-5-vinylpyridine became 3.5 (wt.) percent, respectively. The mixtures were further mixed, respectively, with 0.1 (wt.) percent of the stabilizer RA-1010 and 0.2 (wt.) percent of dilauryl thiodipropionate and shaped into pellets at 220° C. The pellets were subjected to melt-spinning at 270° C. and were drawn to MDR×0.8. The resulting fibers were examined in dyeability and in variation of properties of fibers by irradiation with a carbon arc type fade meter and in the same manner as in Example 5 to obtain the results as shown in Table 11.

TABLE 11

| Sample No. | Degree of dye exhaustion (percent) | Variation of dry strength by fade meter irradiation (g./d.) after— | | | Variation of dry elongation by fade meter irradiation (percent) after— | | |
|---|---|---|---|---|---|---|---|
| | | 0 hr. | 100 hrs. | 200 hrs. | 0 hr. | 100 hrs. | 200 hrs. |
| A | 98 | 4.8 | 4.9 | 3.9 | 26 | 28 | 30 |
| B | 100 | 4.6 | 4.5 | 3.2 | 25 | 25 | 19 |
| C | 98 | 4.3 | 3.0 | 1.7 | 25 | 27 | 7 |

From the results of Table 11, it is understood that the fibers A and B obtained according to the present invention are excellent also in weather resistance as compared with the control C.

TABLE 9

| Experiment No. | Phosphorus compound | Percent | Quality of fiber | | Results of dyeing test | | |
|---|---|---|---|---|---|---|---|
| | | | Dry strength (g./d.) | Dry elongation (percent) | Degree of dye exhaustion (percent) | Fastness to light (grade) | Brilliancy (percent) |
| 1 | None | | 5.6 | 26 | 89 | 3 | 63.5 |
| 2 | Dibutyl hydrogen phosphite | 0.5 | 5.3 | 28 | 92 | 4-5 | 67.2 |
| 3 | Octadecyl phosphite | 0.5 | 5.5 | 24 | 90 | 4 | 66.8 |
| 4 | P-nonylphenyl phosphite | 0.5 | 5.8 | 25 | 88 | 4-5 | 66.9 |
| 5 | Trilauryl trithiophosphite | 0.5 | 5.4 | 23 | 94 | 4 | 67.0 |
| 6 | 3,9-diphenoxy-2,4,8,10-tetraoxa-3,9-diphosphoric[5,5]-undecane | 0.5 | 5.7 | 25 | 90 | 5 | 67.5 |
| 7 | Tetrakis (p-nonylphenyl)-p-methylene phenyldiphosphite | 0.5 | 5.5 | 27 | 93 | 4-5 | 67.2 |

EXAMPLE 10

Graft polypropylene containing 16 (wt.) percent of branch polymer comprising 2-methyl-5-vinyl pyridine and propyl acrylate in a weight ratio of 75 to 25 and having an intirnsic viscosity [$\eta$] of 0.38 was obtained in the same manner as in Example 1. One hundred parts of this graft polypropylene were mixed with 200 parts of unmodified polypropylene and stabilizers, and the mixture was shaped into pellets at 220° C. The pellets were subjected to melt-spinning at 270° C. and were drawn at 130° C. to MDR×0.7. Thus obtained fibers were scoured in a bath containing 2% OWF of Scourol No. 400 and 0.5% OWF of sodium pyrophosphate under a bath ratio of 1:50 at 70° C. for 15 minutes, then sufficiently washed with water and dried. Then, the dried fibers were subjected to pretreatment in a bath containing 2 g./l. of sulfuric acid under a bath ratio of 1:50 at 100° C. for 30 minutes, were washed with water and dyed under the following conditions.

The dyeing was carried out in a dye bath containing 0.5% OWF of the acid dye Fenazo Scarlet B (C.I. 26905), 2% OWF of sulfuric acid and 10% OWF of trinonyl phenyl phosphite under a bath ratio of 1:50, wherein the dyeing temperature of 30° C. was gradually elevated so that it reaches the boiling point. Further, in order to make sure of level dyeing, the dyeing temperature was maintained at the boiling point for additional 90 minutes while frequently agitating the fibers. The dyed articles were then taken out from the dye bath, were washed with water and then soaped in a bath containing 2.5% OWF of Scourol No. 400 and 0.5% OWF of sodium carbonate under a bath ratio of 1:50 at 70° C. for 20 minutes. Finally, the resulting dyed articles were thoroughly washed with water, dried and subjetced to a test for measuring fastness to sunlight. Consequently, the result as shown in Table 12 were obtained. Furthermore, for comparison, sake, fastness to sunlight of dyed articles which were obtained in the same procedures of scouring, dyeing and soaping as in this example except that a dye bath containing no trinonylphenyl phosphite was employed, was listed in Table 12.

TABLE 12

| Experiment No. | Dye | Phosphorus compound to be added to dye bath | Degree of dye exhaustion (percent) | Fastness to light (grade) |
|---|---|---|---|---|
| 1 | Fenazo Scarlet B | Trinonylphenyl phosphite | 100 | 4-5 |
| 2 | do | do | 100 | 2 |

From the results of Table 12, it is understood that a dyed article having more excellent fastness to light can be obtained in case of a dye bath containing phosphorus compound, compared with that not containing the same.

EXAMPLE 11

The same fibers obtained as in Example 10 were scoured in the same manner, and then were dyed under the following conditions. The dyeing was carried out in a dye bath containing 0.5% OWF of the disperse dye Kayalon Fast Blue FG (C.I. 62050) and 0.5% OWF of Dispanol N under a bath ratio of 1:50 in the same manner, and the dyed fibers were soaped in the same manner as in Example 10.

Thus obtained dyed articles were treated in a bath containing 15% OWF of trilauryl trithiophosphite under a bath ratio of 1:50 at 100° C. for 30 minutes, then sufficiently washed with water and dried. When fastness to light thereof was measured, the result as shown in Table 13 was obtained. Furthermore, for comparison sake, fastness to light of an article which was not treated in a bath containing trilauryl trithiophosphite was measured and was denoted in Table 13.

TABLE 13

| Experiment No. | Dye | After-treatment with phosphorus compound | Degree of dye exhaustion (percent) | Fastness to light (grade) |
|---|---|---|---|---|
| 1 | Kayalon Fast Blue FG | Trilauryl trithiophosphite | 64 | 4 |
| 2 | do | | 64 | 2-3 |

From the results of Table 13, it is understood that a dyed article subjected to after-treatment with a bath containing phosphorus compound shows superior fastness to light to that of a dyed article obtained without subjecting to said after-treatment.

What we claim is:

1. Dyeable polypropylene fibers stable to heat, light and oxidation consisting of a polypropylene composition comprising polypropylene and polypropylene graft-copolymerized with a vinylpyridine and an ester selected from the group consisting of acrylate and methacrylate esters, the weight of the branch polymer being from 1 to 15% based on the weight of said composition and said branch polymer comprising 90-30% by weight of the vinyl-pyridine and 10-70% by weight of said ester, said fibers being prepared by graft polymerizing a mixture of said vinylpyridine, said ester and activated polypropylene previously hydroperoxidized in the presence of oxygen at a temperature of from 70–130° C. so that the resulting graft polypropylene contains 10-50% by weight of said polymer and has an intrinsic viscosity $\eta$ of 0.2–2.0, and mixing the thus obtained graft polypropylene with unmodified polypropylene, and then subjecting the mixture to melt-spinning.

2. Fibers according to claim 1 wherein the branch polymer in the graft polypropylene comprises 80-50% by weight of vinylpyridine and 20-50% by weight of said ester and has an intrinsic viscosity $\eta$ of 0.3–1.0.

3. Fibers according to claim 1 wherein the mixing of graft polypropylene with unmodified polypropylene is effected in the presence of 0.01-2.0% by weight based on the total polypropylene composition of a member selected from the group consisting of a nonionic surface active agent, an organo-phosphorus compound and mixtures thereof.

4. Fibers according to claim 3 wherein the nonionic surface active agent is a member selected from the group consisting of a polyoxyethylene alkylamine, a polyoxyethylene alkyl phenol ether, a polyoxyethylene alkyl ether, a polyoxyethylene alkyl ester, a sorbitan alkyl ester, a polyoxyethylene sorbitan alkyl ester, polyoxyethylene, polyoxypropylene, polyoxyisobutylene, a copolymer of ethylene oxide and propylene oxide, polyoxytetramethylene and mixtures thereof, and the organo-phosphorus compound is a member selected from the group consisting of phosphorus compounds represented by the general formulas:

wherein $R_1$, $R_2$ and $R_3$ are alkyl, aryl or aralkyl, and X is oxygen or sulfur;

wherein $R_4$ and $R_5$ are alkyl, aryl or aralkyl;

wherein $R_6$, $R_7$, $R_8$ and $R_9$ are alkyl, aryl or aralkyl and $R_{10}$ and $R_{11}$ are hydrogen or alkyl, and mixtures thereof.

5. Fibers according to claim 1 wherein the mixing of graft polypropylene with unmodified polypropylene is effected in the presence of 0.01–2.0 weight percent based on the total polypropylene composition of a nonionic surface active agent.

6. Fibers according to claim 5 wherein the nonionic surface active agent is selected from the group consisting of a polyoxyethylene alkylamine, a polyoxyethylene alkyl phenol ether, a polyoxyethylene alkyl ether, a polyoxyethylene alkyl ester, a sorbitan alkyl ester, a polyoxyethylene sorbitan alkyl ester, polyoxyethylene, polyoxypropylene, polyoxyisobutylene, a copolymer of ethylene oxide and propylene oxide, polyoxytetramethylene and mixtures thereof.

7. Fibers according to claim 1 wherein the activated polypropylene contains 0.02–0.20% by weight of a peroxide group.

8. Fibers according to claim 7 wherein the intrinsic viscosity of activated polypropylene $\eta_p$ and the intrinsic viscosity of polypropylene before activation $\eta_o$ satisfies the relation $\eta_p/\eta_o \geq 0.4$.

9. Fibers according to claim 8 wherein the graft polymerization is effected in the presence of a solvent selected from the group consisting of methanol, an aqueous methanol solution and an aqueous organo-carboxylic acid solution.

10. Fibers according to claim 9 wherein the solvent is an aqueous acetic acid solution.

11. Fibers according to claim 9 wherein the graft polymerization is effected in the presence of a ferrous salt as a reducing agent.

12. Fibers according to claim 1 wherein the polypropylene used in graft-polymerization has been hydroperoxidized in an aqueous emulsion.

13. Fibers according to claim 12 wherein the polypropylene used in the graft polymerization has a peroxide group content of 0.02–0.2% by weight.

14. Fibers according to claim 13 wherein the intrinsic viscosity of activated polypropylene $\eta_p$ and the intrinsic viscosity of polypropylene before activation $\eta_o$ satisfies the relation $\eta_p/\eta_o \geq 0.4$.

15. Fibers according to claim 1 wherein the vinylpyridine is selected from the group consisting of 2-vinylpyridine, 3 - vinylpyridine, 4 - vinylpyridine, 2-methyl-5-vinylpyridine, 4 - methyl - 5-vinylpyridine, 5-ethyl-2-vinylpyridine, 2-isopropenylpyridine, 3-isopropenylpyridine and 4-isopropenylpyridine, and said ester is selected from the group consisting of methyl acrylate; ethyl acrylate, propyl acrylate, butyl acrylate, 2-ethylhexylacrylate, cyclohexyl acrylate, lauryl acrylate, stearyl acrylate, ethyl methacrylate, methyl methacrylate, propyl methacrylate, butyl methacrylate, cyclohexyl methacrylate, lauryl methacrylate and stearyl methacrylate.

16. Fibers according to claim 15 wherein the mixing of graft polypropylene with unmodified polypropylene is effected in the presence of 0.01–2.0% by weight of at least one nonionic surface active agent selected from the group consisting of polyethylene glycol, polypropylene glycol and copolymer of ethylene oxide and propylene oxide.

References Cited

UNITED STATES PATENTS

| | | | |
|---|---|---|---|
| 3,322,661 | 5/1967 | Yoshikawa et al. | 260—878 X |
| 3,073,667 | 1/1963 | Bonvicini et al. | 260—878 X |
| 3,493,480 | 2/1970 | Kuroda et al. | 260—876 |

FOREIGN PATENTS

| | | | |
|---|---|---|---|
| 879,195 | 10/1961 | Great Britain | 260—876 |
| 1,420,772 | 11/1965 | France | 260—878 |

MURRAY TILLMAN, Primary Examiner

H. W. ROBERTS, Assistant Examiner

U.S. Cl. X.R.

8—17, 31, 74, 88, 89, 93, 165, 180, Digest 9; 204—159.17; 260—29.6 XA, 33.4 PQ, 45.7 R, 45.7 P, 45.851, 45.9 P, 45.95, 877; 264—78, 176, 878